United States Patent
Fiala et al.

(10) Patent No.: US 8,930,250 B1
(45) Date of Patent: Jan. 6, 2015

(54) SYSTEM AND METHOD OF EVALUATING AN INVESTMENT PORTFOLIO

(75) Inventors: William Elliott Fiala, Creve Coeur, MO (US); Matthew James Mikula, St. Louis, MO (US)

(73) Assignee: Edward Jones & Co., St. Louis, MO (US)

( * ) Notice: Subject to any disclaimer, the term of this patent is extended or adjusted under 35 U.S.C. 154(b) by 387 days.

(21) Appl. No.: 13/016,919

(22) Filed: Jan. 28, 2011

Related U.S. Application Data

(63) Continuation-in-part of application No. 12/869,529, filed on Aug. 26, 2010.

(51) Int. Cl.
*G06Q 40/00* (2012.01)

(52) U.S. Cl.
USPC .......................................................... 705/35

(58) Field of Classification Search
USPC .................................................... 705/35–45
See application file for complete search history.

(56) References Cited

U.S. PATENT DOCUMENTS

| | | | |
|---|---|---|---|
| 5,884,287 A | 3/1999 | Edesess | |
| 5,893,079 A | 4/1999 | Cwenar | |
| 5,911,136 A | 6/1999 | Atkins | |
| 5,999,918 A | 12/1999 | Williams et al. | |
| 6,021,397 A | 2/2000 | Jones et al. | |
| 6,061,663 A * | 5/2000 | Bloom et al. | 705/36 R |
| 6,360,210 B1 | 3/2002 | Wallman | |
| 6,484,152 B1 | 11/2002 | Robinson | |
| 6,839,686 B1 | 1/2005 | Galant | |
| 7,340,425 B2 | 3/2008 | Boyle et al. | |
| 7,373,324 B1 | 5/2008 | Engin et al. | |
| 7,403,918 B2 | 7/2008 | Kochansky | |
| 7,512,555 B2 | 3/2009 | Finn | |
| 7,577,597 B1 | 8/2009 | Allison et al. | |
| 7,672,890 B2 | 3/2010 | Hernandez | |
| 2002/0038273 A1 | 3/2002 | Wherry et al. | |
| 2002/0143680 A1 | 10/2002 | Walters et al. | |
| 2002/0147671 A1 | 10/2002 | Sloan et al. | |
| 2003/0093352 A1 | 5/2003 | Muralidhar et al. | |
| 2003/0208429 A1 | 11/2003 | Bennett | |
| 2003/0212621 A1 | 11/2003 | Poulter et al. | |
| 2004/0078271 A1 * | 4/2004 | Morano et al. | 705/19 |
| 2004/0267651 A1 | 12/2004 | Jenson et al. | |
| 2005/0273413 A1 | 12/2005 | Vaudrie | |
| 2006/0031149 A1 | 2/2006 | Lyons et al. | |
| 2007/0130043 A1 | 6/2007 | O'Shaughnessy et al. | |
| 2007/0192224 A1 | 8/2007 | Quayle et al. | |
| 2008/0071702 A1 | 3/2008 | Howard et al. | |
| 2008/0162373 A1 * | 7/2008 | Adler et al. | 705/36 R |
| 2008/0294571 A1 | 11/2008 | Maloney et al. | |
| 2009/0248589 A1 | 10/2009 | Snyder et al. | |

FOREIGN PATENT DOCUMENTS

| | | |
|---|---|---|
| JP | 2005-141694 A | 6/2005 |
| WO | 99/56192 A2 | 11/1999 |
| WO | 03/075122 A2 | 9/2003 |
| WO | 2008/135511 A1 | 11/2008 |
| WO | 2008/138065 A1 | 11/2008 |

* cited by examiner

*Primary Examiner* — Robert Niquette
*Assistant Examiner* — Chia Yi Liu
(74) *Attorney, Agent, or Firm* — Duane Morris LLP

(57) ABSTRACT

A system and method for performing a diagnostic evaluation of an investment portfolio by categorizing the assets in the portfolio, establishing thresholds for each category and identifying assets that are not in compliance with the established thresholds.

16 Claims, 16 Drawing Sheets

Portfolio Diagnostic Report
Portfolio Objective: Balanced Toward Growth

Ted Jones
Financial Advisor  222

Prepared for: Bob Beck
Account Number: 99999-11

Edward Jones®

Page 2 of 4
May 20, 2009

International

Investing beyond U.S. borders can help provide potential growth opportunities and increase overall portfolio diversification.

Your international investments are slightly above our suggested guidelines, which may expose your portfolio to slightly more risk than is appropriate for your portfolio objective.

|  | Actual | Suggested Midpoint | Difference from Midpoint (of Suggested Range) |
|---|---|---|---|
| International Equity | 4% | 3% | 1% 6,500 |
| International Income | 15% | 17% | 16% 104,000 |
| Total International | 19% | 20% | 17% 110,500 |

224 226 228

Niche

In some cases niche investments can provide additional diversification because they don't necessarily move in unison with the overall stock and bond markets. They may offer the potential for higher returns, if you're willing to assume a higher level of risk. Niche investments are not suitable for all investors.

One niche investment is above our suggested guidelines. This may expose your portfolio to more risk that you're comfortable with.

232

|  | Actual | Suggested Midpoint | Above Suggested |
|---|---|---|---|
| Aggressive Income | 6% | <5% | 1% 6,500 |
| Emerging Markets | 12% | <5% | 7% 45,500 |
| Natural Resources | 0% | <5% | — — |
| Real Estate | 4% | <5% | — — |
| Total Niche | 22% | <20% | — — |

Bond Ladder

Bonds can have short-, intermediate- and long-term maturities. Depending on when a bond matures or can be called back by the issuer, each type will likely react differently to changes in interest rates. We generally recommend dividing a fixed-income portfolio by putting about one-third into each of these categories.

Your long-term bonds are above suggested guidelines. This may provide more income now, but the value of the bonds could decline if interest rates rise.

242

|  | Actual | Suggested Midpoint | Difference from Midpoint (of Suggested Range) |
|---|---|---|---|
| Short Term | 36% | 30% | 6% 7,200 |
| Intermediate Term | 14% | 40% | -26% (31,200) |
| Long Term | 50% | 30% | 20% 24,000 |
| Total Bonds | 100% | 100% | 0% — |

FIG. 2B

Portfolio Diagnostic Report
Portfolio Objective: Balanced Toward Growth

Edward Jones®
Page 3 of 4
May 20, 2009

Ted Jones — Financial Advisor
Prepared for: Bob Beck
Account Number: 99999-11

Corporate Bond Diversification

252 — For appropriate diversification, we recommend that corporate bonds be diversified across the three major bond sectors: financial services, utilities and industrials. Your bonds are slightly outside our suggested guidelines for industrials and utilities.

| | Actual (254) | Suggested Midpoint (256) | Difference from Midpoint (of Suggested Range) (258) |
|---|---|---|---|
| Financials | 38% | 40.0% | 0.5% — 250 |
| Industrials | 31% | 42.5% | -14.0% — (7,000) |
| Utilities | 31% | 17.5% | 13.5% — 6,750 |
| Total Corporate Bonds | 100% | 100% | 0% — |

Muni Bond Diversification

262 — For appropriate diversification, we recommend that municipal bonds be diversified. In general, we recommend a large portion be general obligation bonds. If you own revenue bonds, we recommend diversifying by sector.

Your revenue municipal bonds are slightly outside the tax-backed range. Keep this in mind as you consider how to maintain a balanced fixed-income portfolio.

| | Actual | Suggested Midpoint (266) | Below Suggested Range | Above Suggested |
|---|---|---|---|---|
| General Obligation | 65% | 30%-100% | | |
| Revenue Bonds | Actual | Suggested | | |
| Taxed Back | 22% | <20% | | 2.0% — 1,400 |
| Utilities | 13% | <20% | | |
| Transportation and Other | 0% | <15% | | |
| Education | 0% | <15% | | |
| Health Care | 0% | <10% | | |
| Housing | 0% | <10% | | |
| Total Muni Bonds | 100% | | | 2% — 1,400 |

Stock Sector Diversification

264 — By being overweight in a sector, we believe you may be taking too much risk. Here are the sectors that are outside our suggested guidelines. Discuss what risk this could pose to your overall portfolio and financial goals.

| | Actual | Suggested | Above Suggested |
|---|---|---|---|
| Health Care | 20% | 18% | 2% — 1,600 |
| Technology | 20% | 14% | 6% — 4,800 |
| Utilities | 13% | 4% | 9% — 7,200 |
| Total | | | 13,600 |

FIG. 2C

Portfolio Builder for: BOSS, JAMES H & LAUREN M

Input → Allocate New Money → Address Diagnostic → Product Selection → Review

? Help

Preferences
* Name on report:
* Selection preference: ● Research-driven ○ Custom
* Add new money: ○ Yes ○ No

Verify Objectives
Current portfolio objective: Balanced Towards Growth ⟵ 300
New portfolio objective: Balanced Towards Growth ⟵ 310

Account objectives:

| | | | Cash | Inc | Aggr Inc | G&I | Growth | Aggr |
|---|---|---|---|---|---|---|---|---|
| Boss, James & Lauren | 997530344 | Joint | ☐ | ☐ | ☑ | ☐ | ☐ | ☐ |
| Boss, James | 997526B3 | Single | ☐ | ☐ | ☐ | ☑ | ☐ | ☐ |
| Boss, Lauren | 997397309 | Traditional IRA | ☐ | ☐ | ☐ | ☐ | ☑ | ☐ |
| Boss, James | 9975304S | Roth IRA | ☑ | ☐ | ☐ | ☐ | ☑ | ☐ |
| Boss, Sarah | 997530d6 | 529 | ☐ | ☐ | ☐ | ☐ | ☐ | ☐ |
| Boss, Hannah | 9975304/ | 529 | ☐ | ☐ | ☐ | ☐ | ☐ | ☐ |

330

☐ Existing account objectives
Changes are for proposal purposes only and will not update actual objectives.

[ Next > ]

320 (brace around account list)

* Indicates required field

| Key Client Metrics | Client Contact Plans | Client Reviews | Client Goals | Portfolio Screener | Rank Holdings | Capital Gains & Losses |

Our Branch

Diagnostic | Portfolio Alerts | Power Search

Show: Asset Allocation  ▼  for: Joe Smith  ▼  as of 30-Jun-2010                                   [Customize] [Create List] [Print]

Portfolio Size
- ☑ > $50,000
- ☐ > $100,000
- ☐ > $250,000
- ☐ > $500,000
- ☐ Custom

Objective
- ☑ Preservation of principal
- ☑ Income focus
- ☑ Balanced toward income
- ☑ Balanced - G&I
- ☑ Balanced toward growth
- ☑ Growth focus
- ☑ All equity
- ☑ No objective

Display
- ⦿ % from target
- ○ % Actual
- ○ $ from target
- ○ $ Actual

Goal
- ⦿ Retirement
- ○ Education
- ○ Other
- ○ Total

Diagnostic
- ☑ Red
- ☑ Yellow
- ☐ Green

Discussed
- ☐ Yes
- ☐ No

1110

| Portfolio | Amount | Obj | Goal | Client | Menu | % Cash | % Inc | % G & I | % Gth | % Aggr | % Equity▲ | % Intl |
|---|---|---|---|---|---|---|---|---|---|---|---|---|
| Smith, John | 1,285,223 | BGI | Ret | | Menu▶ | +7.5 | -32.5 | +19.4 | -5.6 | 0.0 | +25.0 | 0.0 |
| Boss, James | 525,252 | BTG | Ret | | Menu▶ | -0.5 | -17.9 | +20.3 | +3.6 | -5.5 | +18.4 | +5.0 |
| Williams, Keri S | 444,868 | GF | Ret | | Menu▶ | -1.7 | -4.0 | +25.2 | -11.5 | -8.0 | +5.7 | -17.0 |
| Inselmann, Jessika | 85,968 | BTG | Ret | | Menu▶ | -4.5 | +5.5 | +11.0 | -20.0 | +8.0 | -1.0 | +15.0 |
| Lehman, Tracy | 59,800 | GF | Ret | | Menu▶ | +19.0 | -7.0 | -12.5 | -5.0 | +5.5 | -12.0 | -3.0 |
| Stenflenagel, William | 125,258 | IF | Ret | | Menu▶ | -3.0 | +16.0 | -5.0 | -3.0 | -5.0 | -13.0 | -3.0 |
| Jones, Brad | 658,102 | BTG | Ret | | Menu▶ | -3.0 | 22.0 | -17.6 | -5.6 | +4.0 | -19.2 | -12.0 |

1120

Top | Bottom | Previous | Next

| Total/Avg - All Portfolios | $3,181,411 | | | | | 2.0% | -2.5% | 5.8% | -5.1% | -0.1% | 0.6% | 4.0% |

SYSTEM AND METHOD OF EVALUATING AN INVESTMENT PORTFOLIO

The present application is a continuation in part of U.S. patent Ser. No. 12/869,529 filed Aug. 26, 2010, titled "Method and System for Building an Investment Portfolio", the disclosure of which is hereby incorporated by reference herein.

The present disclosure is directed to the maintenance of an investment portfolio in compliance with an investment objective. Specifically, the present disclosure is directed to the maintenance of an investment portfolio created for an investor based on investment objectives by applying a diagnostic tool that facilitates compliance with the investment objectives by tracking the current state of the portfolio, identifying areas that are not in compliance and offering solutions to satisfying the investment objectives.

It is known in the prior art to develop investment objectives based on basic financial information provided by an investor, which typically includes information related to investment goals, financial status, age, income, retirement goals, and financial needs. Investment goals are well known and may include preservation of capital, aggressive growth, balance and risk tolerance. Standard portfolio models are well known to achieve investment objectives and are normally presented in terms of a pie chart with the asset allocation portrayed as a piece of the pie. In its simplest form, the asset allocation is typically divided between individual financial instruments having different classifications, e.g., equity, bonds, cash or equivalents, etc. with a designated goal of percentage for each financial instrument being identified. Assets can then be acquired in accordance with the goals corresponding to the pie chart. Periodically, the portfolio is reviewed and any deviations from the allocation designated by the pie chart can be identified. For example, an investment objective may dictate an asset allocation of goal of 55% equity, 35% bonds, and 10% cash can be reviewed periodically to ascertain the current market value of the assets to determine compliance with the investment goals. If the current market value indicates 47% equity, 43% bonds and 10%, prior art systems can identify the deviation for the investment goal. However, most prior art systems are manual in nature and are thus limited in providing a detailed solution and options to return the asset allocation to comply with the investment goals. Moreover, asset allocation based on asset type may not provide sufficient granularity to achieve the investment goals. These prior art systems that rely solely on asset allocation are one dimensional in that they do not drill down further to the individual financial instruments that make up the asset allocation.

A more sophisticated prior art model may use multiple accounts, each containing a different model allocation. Each of the different models can be a component of a unified managed account (UMA) where individual account managers designate the investment criteria for the individual accounts, also known as investment sleeves, and an overlay manager assists in optimizing investment goals across the individual accounts. For example, in one prior art UMA system, the overlay manager assists with tax harvesting across the individual accounts. If one account presents an opportunity to realize a gain, the overlay manager may identify a loss which presents a beneficial shielding of the gain. Typically, this type of tax harvesting is opportunistic in the sense that it optimizes the tax treatment across multiple accounts as they occur but may not assist in proactive investment planning.

The use of models is problematic in that the evaluation is one dimensional in the sense that assets are typically tracked by their relative position with respect to the overall portfolio. There is limited ability to differentiate between assets in an asset class. For example a portfolio model may identify an asset class as a security without regard to the technology sector or the consumer discretionary sector corresponding to the security. A security in the high tech industry may behave much differently than a security in the hospitality industry. Typical prior art financial diagnostic tools can not differentiate in a specific asset class for differences in the characteristics of the individual assets.

Applicant's co-pending application Ser. No. 12/869,529 provides a detailed method of building an investment portfolio by allocating assets among not only asset classes but also selecting specific financial instruments in specific sectors, as well as specific product types.

The present disclosure is directed to a processor implemented method of monitoring of the asset allocation of a portfolio and includes a diagnostic tool that not only identify deviations from the portfolio objectives but provides greater granularity than afforded in the prior art by recommending specific transactions to return the portfolio to compliance with the portfolio objectives.

In one embodiment, the present disclosure can be utilized by a financial advisor in reviewing the investment portfolios of many clients to identify portfolios that may need to reallocate assets in order to meet the respective clients' investment objectives. Once these portfolios are identified, the financial advisor may utilize the present disclosure to prioritize the portfolios and recommend specific transactions in specific financial instruments to ensure compliance with the respective investment objectives.

BRIEF DESCRIPTION OF THE DRAWINGS

FIGS. 2A-2D is a simplified pictorial representation of a diagnostic report generated using the embodiment of FIG. 1.

FIG. 3 illustrates one embodiment of a user interface showing the use of the present disclosure for evaluating a portfolio.

FIG. 4 illustrates one embodiment of a user interface showing the use of the present disclosure for evaluating a portfolio.

FIG. 7A-B illustrates one embodiment of a user interface showing the results of a diagnostic evaluation regarding "Sell Rated Securities".

FIG. 11 illustrates one embodiment of a user interface showing portfolios ranked in priority order based on a single evaluation category generated as a result of a diagnostic evaluation of a portfolio using the present disclosure.

FIG. 13 illustrates one embodiment of a user interface showing portfolios suitable for a specific asset generated as a result of a diagnostic evaluation of a portfolio using the present disclosure.

DETAILED DESCRIPTION

Figure 1:
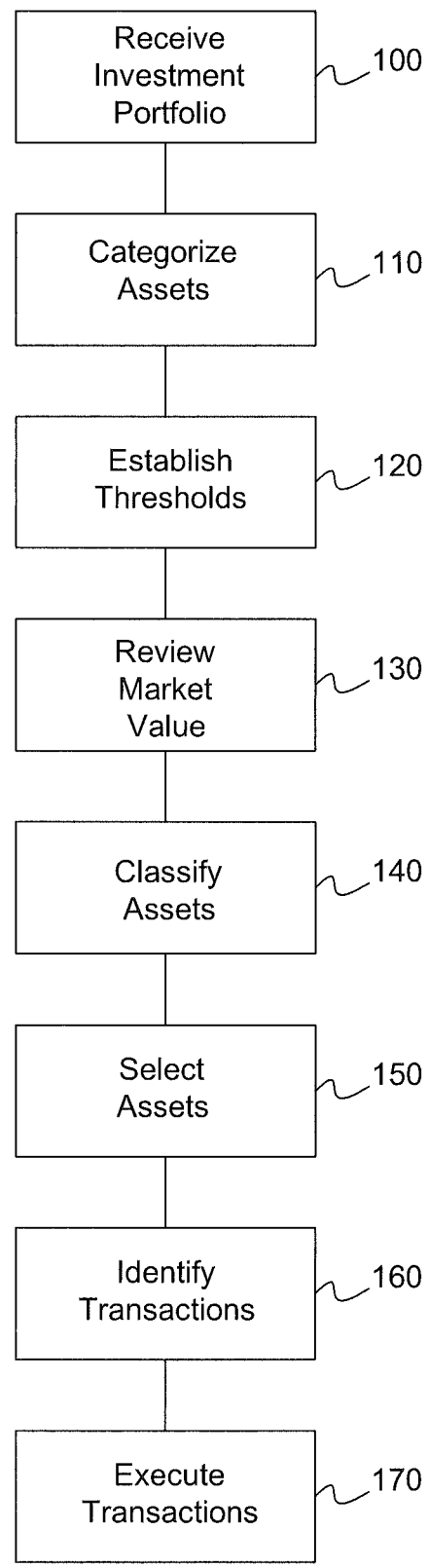
FIG. 1 is a simplified flow diagram of one embodiment of the present disclosure.

FIG. 1 illustrates one embodiment of the present disclosure illustrating the steps of a diagnostic tool. In step 100 an investment portfolio is received for a customer. The investment portfolio may include a plurality of assets and an investment objective for the portfolio. The assets may be represented by a plurality of financial instruments. The term "financial instrument" refers to an instrument representing equity ownership, debt or credit, typically in relation to a corporate or governmental entity, wherein the instrument is saleable, including without limitation, stocks, bonds, unit investment trusts (UITs), mutual funds, exchange traded funds (ETFs), money market funds, etc. Each investment portfolio may also include an investment objective that includes goals for each of the financial instruments. The investment objective may establish suggested guidelines providing for the percentage of each asset in various categories as compared to all assets, or the percentage of each specific financial instrument as compared to all other financial instruments. The investment objective can be used to identify corresponding financial instruments that are within recommended guidelines used by a particular investment advisor to achieve the investment objective of a particular client.

The investment portfolio may be a pre-existing portfolio as in the case when a client brings a portfolio to a financial advisor from another investment firm or advisor. In the alternative, the portfolio may be the result of a portfolio created by the advisor. For example, the portfolio may be created by the financial advisor using the systems and methods disclosed in co-pending and commonly owned application Ser. No. 12/869,529.

In Step 110, each asset can be categorized into at least one evaluation category. The evaluation categories can include "Asset Allocation", "International", "Niche", "Fixed-income (Bond) Ladder", "Corporate Bond Diversification", "Municipal Bond Diversification", "Stock Sector Diversification", "Security Over Concentration", "Sell Rated". The above mentioned evaluation categories are but just one example, and many different evaluation categories can be selected. In addition, the present disclosure allows a multi-dimensional analysis of the portfolio by analyzing evaluation categories that are overlapping. For instance, the evaluation category "Asset Allocation" will overlap with the "International" category when international securities are held in the portfolio. Likewise, the "Asset Allocation" category will overlap with the "Corporate Bond Diversification" category when corporate bonds are held in the portfolio.

Another multi-dimensional aspect not found in the prior art is that the evaluation categories can be hierarchical in nature. For example, for each of the evaluation categories discussed above, additional evaluation categories can be directed the financial instruments held in the category. For example, the "Asset Allocation" evaluation category can be further broken down to evaluation categories corresponding to the suitability categories of "Aggressive", "Growth", "Growth & Income", "Income", "Aggressive Income & Cash." The use of sub-categories allows a more robust evaluation of the portfolio than the prior art one dimensional evaluation systems. For example, an investment objective of "Balanced Toward Growth" may have an asset allocation of 65% equities and 35% cash/income. In a prior art system, the portfolio would be deemed to be in compliance with the suggested guidelines if this 65/35 allocation was met. However, using the diagnostic tool of the present disclosure, this same portfolio may be deemed to be not in compliance if the "Aggressive" equities exceed a predetermined threshold and are over-concentrated with respect to the other equities, notwithstanding that the portfolio satisfies the 65/35 asset allocation.

Likewise, the "International" evaluation category can be further broken down to evaluation categories corresponding to "International Equity" and International Income." The "Niche", sometimes referred to as "non-core" assets, evaluation category can be further broken down to evaluation categories corresponding to "Aggressive Income", "Emerging Markets", "Natural Resources", and "Real Estate." The "Fixed-Income Ladder" evaluation category can be further broken down to evaluation categories corresponding to "Aggressive Income", "Emerging Markets", "Natural Resources", and "Real Estate." The "Corporate Bond Diversification" evaluation category can be further broken down to evaluation categories corresponding to industry sectors such as "Financial", "Industrials", and "Utilities". The "Municipal Bond Diversification" evaluation category can be further broken down to evaluation categories corresponding to "General Obligation" and "Revenue" and subcategories of "Revenue" including "Taxed Back", "Utilities", "Transportation", "Education", "Health Care", and "Housing." The "Stock Sector" evaluation category can be further broken down to evaluation categories corresponding to industry sectors, including "Communications", "Utilities", "Consumer Staples", "Energy", "Health Care", "Financial Services", "Industrials", "Consumer Discretionary" and "Technology."

Thus the present disclosure contemplates breaking down the portfolio into many overlapping "slices", equity vs. cash vs. income, (asset allocation), or international vs. domestic, or core vs. non-core, The present disclosure also contemplates a breakdown by style, i.e., growth, blend value, large mid and small cap.

In step 120, thresholds can be established for each evaluation category as a function of the investment objective. For example, for an "Asset Allocation" category for a portfolio having a growth focused investment objective, the assets goals may be 80% equities and 20% cash/income. Each asset type may have multiple threshold which require different actions. For example, this portfolio may have a first tier threshold for equities at 83% and a second tier threshold for equities at 87%. Unlike in the prior art, in which an investment criteria was either satisfied or not, the present disclosure uses thresholds to establish how far from the criteria is the portfolio and for selecting different responses based on the thresholds.

In one embodiment, financial instruments may be assigned grades or the like that identify varying levels of suitability for investment. The suitability categories can be identified as "Aggressive", "Growth", "Growth & Income", "Income", "Aggressive Income & Cash", and each category can have a desired range based on the entire portfolio. The assets may have thresholds based on the suitability of the constituent financial instruments included in the assets. For example, the equity assets may have threshold corresponding to the suitability classification of the financial instruments such as "Aggressive" threshold established to be 0-2% over the suggested guidance, a "Growth" threshold established to be 0-4% over the suggested guidance and a "Growth & Income" threshold established to be 0-5% over the suggested guidance. The thresholds for a given financial instrument may also be tiered such that a first tier threshold for "Aggressive" instruments is 0-2% over the suggested guidance and a second tier threshold is >3% over the suggested guidance.

Thus, a threshold can be established using a percentage of the total portfolio as a function of the investment objective of the portfolio. In addition, tiered thresholds can be used to indicate the relative deviation of an asset from the suggested guidance provided by the investment objective, e.g., when the asset allocation is deemed to be slightly outside or definitely outside the recommended guidelines used by the investment advisor to meet the client's investment objective. For income/cash assets, separate thresholds can be established for cash and income. The thresholds can indicate when the Asset Allocation is above or below suggested guidelines for the investment objective.

For the evaluation category of "International Investments", a threshold may be established for the percentage of domestic investments as compared to international investments. Another threshold may be the amount of diversification between International Income and Equity investments. Multiple thresholds may be used to indicate when the international investments are either slightly outside, or definitely outside suggested guidelines for the investment objective.

For the "Security Overconcentration" category, a threshold may be established to highlight when a portfolio is over concentrated in a security. Different threshold levels may be selected to identify the level of overconcentration, e.g., slightly over concentrated as compared to definitely over concentrated.

For the "Fixed Income Ladder" evaluation category, thresholds may be established as a function of the maturity dates of the bonds held in the portfolio. For example thresholds can be established so that bond maturities are spread across short, intermediate and long term to balance the risks of price swings.

For the "Corporate Bond Diversification" evaluation category, thresholds may be established which indicate overconcentration in a bond sector. Three main bond corporate bonds sectors may be financial services, utilities and industrials. The thresholds can be set to identify overconcentration in any of the sectors.

For the "Municipal Bond Diversification" evaluation category, thresholds may be established to indicate diversification between general obligation bonds and revenue bonds. Further thresholds may be established to diversify revenue bonds by sector.

For the "Stock Sector Diversification" evaluation category, thresholds can be established to indicate diversification between industry sectors. Industry sectors for stocks may be communications, utilities, consumer staples, energy, health care, financial services, industrials, consumer discretionary and technology.

For the "Sell Rated" evaluation category, a threshold may be set to indicate ownership of a stock, bond, mutual fund or ETF that is subject to a sell recommendation.

For the "Niche Investment" evaluation category, a threshold can be established to indicate diversification between non-core assets such as Aggressive income investment products, Emerging Markets investment products, Natural Resources investment products and Real Estate investment products.

In step 130, the market value of each asset in the portfolio can be determined. For example, the market value of each financial instrument can be determined based on its then available current market price.

In step 140, each asset is classified as a function of the current market value and the established thresholds for each category. For example, the classification for a category may indicate that the investments are within the recommended guidelines. If the investments are within the recommended guidelines, no further action is required for that category. Another classification may be that the investments for the category are slightly outside the recommended guidelines because a first threshold is exceeded. If the investments are slightly outside the guidelines, further action may not be necessary depending on the particular facts and circumstances, but an alert can be provided to prompt the user to take action if desired. Another classification can be that the investment definitively falls outside the recommended guidelines when a second tier threshold is surpassed. Under this classification, the investments holdings may put compliance with the investment objective in jeopardy. The classification of the categories are exemplary and further classifications based on further thresholds can be utilized if desired. The classifications of the categories can be displayed to the user using a graphical user interface and the classifications may be represented by a numerical system, e.g., 1, 2, 3, a color coded system, e.g., red, yellow, green, and an alphabetical system e.g., A, B and C and the like.

In step 150, assets which are classified as not within suggested guidelines can be selected to evaluate options for returning them to within guidelines.

In Step 160, options can be generated that return the asset to within the guidelines. For example, if the asset allocation is not within guidelines due to the "Aggressive" equities in excess of a threshold, the present disclosure can identify options to reduce the relative holdings of the "Aggressive" equities. For example, an option may be to sell some of the financial instruments in the "Aggressive" equity category. Another option could be to purchase financial instruments in the income asset class to reduce the relative position of the "Aggressive" equities. Thus a transaction in one asset class can be identified to solve a potential problem in another asset class.

By evaluating all of the evaluation categories for assets not within the guidelines, a number of options can be presented to return the portfolio to the suggested guidelines in order to achieve the investment objective. In some cases, execution of a transaction for one evaluation category may impact another. For example, in a scenario where a cash position is larger the suggested guidelines, the cash can be used to purchase equities to bring the portfolio back within the suggested guidelines. The identified transaction options may also be based on research available to the financial advisor. For example, in the case where the "Asset Allocation" evaluation indicates that the amount of equities is below the suggested guidelines for the investment objection, the financial advisor can be presented with recommended stocks that are eligible for inclusion in the portfolio in view of the portfolio objective.

In step 170, the available transaction options can be presented to the client for the client to make a determination of which options to execute.

Thus, through the use of thresholds and classifications, each evaluation category can provide a quick indication of whether the category is within guidelines, and if not, how far it is from the guidelines. Moreover the present disclosure can provide options to return the assets in the evaluated category to within guidelines.

Figure 2A:
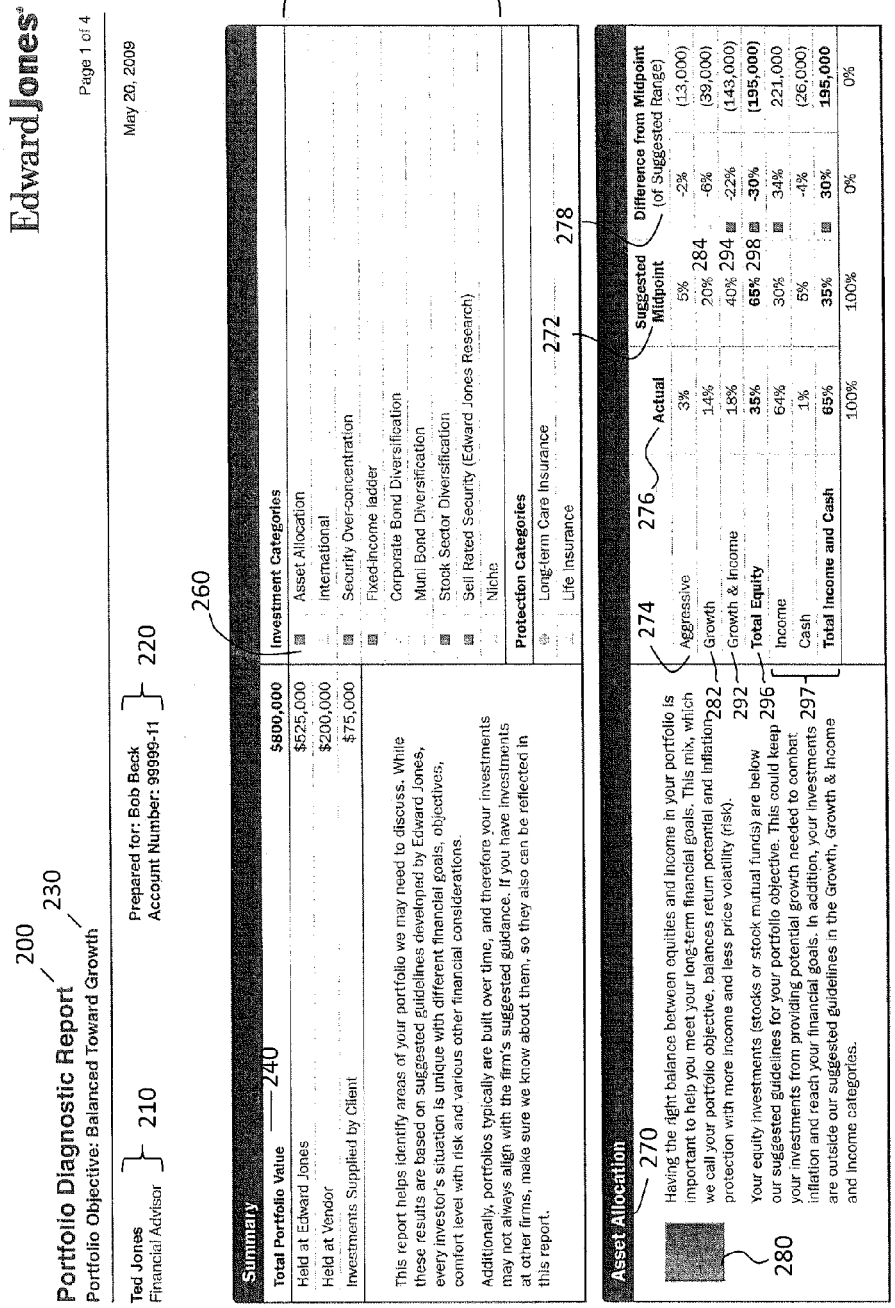

FIGS. 2A-2D illustrate one embodiment of a report that can be generated using the diagnostic method of the present disclosure. With reference to FIG. 2A, a portfolio diagnostic report can be generated by a financial advisor 210 to evaluate the current status of an investment portfolio of a client 220. The investment portfolio can be a portfolio created by the financial advisor 210, or can be a pre-existing portfolio that is currently being handled by the financial advisor. The investment portfolio has an investment objective 230 of "Balanced Toward Growth", which in this embodiment may be subject to suggested guidelines of 65% equities and 35% cash/income. The total portfolio value 240 indicates the value of the portfolio held at the firm of the financial advisor, as well as at other films.

The summary includes each of the evaluation categories 250, as well as the classification 260 of the evaluation category. In this embodiment, a green circle indicates the category is within suggested guidelines, a yellow triangle indicates the category is slightly outside suggested guidelines and a red square indicates the category is well outside the suggested guidelines. Each evaluation category 250 is then described in more detail in individual sections.

The "Asset Allocation" category 270 is generally indicated to be well outside the suggested guidelines as indicated by the red square 280. The financial instruments that make up the assets, characterized by their suitability, can be displayed with an indication of whether the financial instruments concentrations are within the suggested guidelines and whether any action is necessary. In this embodiment, the suggested concentration guideline 272 for "Aggressive" equities 274 is 5%. Based on the market value of the equities, the actual concentration 276 is 3%. Although the "Aggressive" equities is 2% less than the guidelines, it is not greater than a threshold established for the "Aggressive" equities and thus no action is recommended for the "Aggressive" equities. With respect to the "Growth" equities, the actual concentration 276 is 6% less than the suggested guideline 272. Because this difference 278 is greater than a first tier threshold for "Growth" equities, this equity is classified as slightly below the suggested guideline as indicated by the yellow triangle 284. The first tier threshold for "Growth" equities in this embodiment is >4% from the guidelines, and the second tier threshold is >10%.

The "Growth & Income" equities actual concentration 276 is 22% less than the suggested guideline 272. Because this difference 278 is greater than a second tier threshold for "Growth & Income" equities, this equity is classified as well below the suggested guideline as indicated by the red square 294. The first tier threshold for "Growth & Income" equities in this embodiment is >4% from the guidelines, and the second tier threshold is >10%.

As a result of the evaluation of the equity portion of the portfolio, the "Total Equity" 296 is 30% less than the suggested guideline 272 and because the difference 278 is greater than a second tier threshold, the "Total Equity" is classified as well below the suggested guidelines and is indicated by a red square 298.

A similar evaluation can be done for the "Cash/Income" assets 297. The net result is that the "Asset Allocation" 270 is indicated to be well below the suggested guidelines as indicated by the red square 280.

With reference to FIG. 2B, a similar evaluation is done for "International" 222, "Niche" 232 and "Bond Ladder" 242 assets. Each of the categories has an actual concentration 224, guideline concentration 226, difference 228 between the actual and suggested and associated thresholds (not shown) for each of the financial instruments included in the category. Based on a comparison of the difference 228 with the appropriate thresholds, each category 222, 232 and 242 can be classified.

With reference to FIG. 2C, a similar evaluation is done for "Corporate Bond Diversification" 252, "Muni Bond Diversification" 262 and "Stock Sector Diversification" 264 assets. For "Corporate Bond Diversification" 252, an actual concentration 254, guideline concentration 256, difference 258 between the actual and suggested and associated thresholds (not shown) is indicated for each of the financial instruments included in the category.

With respect to "Muni Bond Diversification" 262 and "Stock Sector Diversification" 264 assets, the suggested guidelines 266 provide a range and the difference 268 is determined to be above or below the guideline range. The appropriate thresholds are selected based on the guideline range.

Figure 2D:
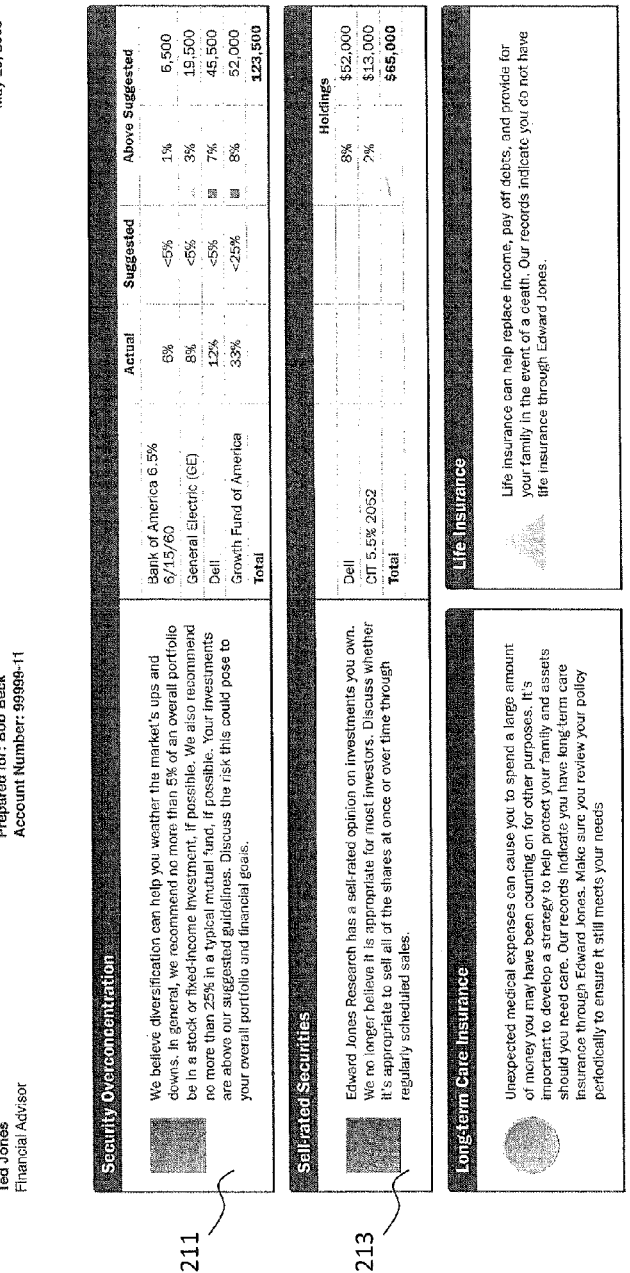

FIG. 2D provides the diagnostics results for the "Security Overconcentration" 211 and "Sell-rated Securities" 213 categories. Unlike the other categories, the "Security Overconcentration" 211 and "Sell-rated Securities" 213 identify the specific financial instruments that do not satisfy the suggested guidelines.

FIG. 3 illustrates one embodiment of a user interface illustrating a portfolio that can be evaluated using the present disclosure. The portfolio investment objective 300 is identified as Balanced Toward Growth. The portfolio consists of several accounts 320, each having a respective suitability category(ies) 330. The diagnostic tool can be run to evaluate the portfolio as a whole, or can be run to evaluate an individual account, or subset of accounts. In the case where the diagnostic tool indicates that the investment objective is not being met, and the client is comfortable with the current holdings, the investment objective can be selected from a pull-down menu 310 to more accurately reflect the client's current investment strategy, and the diagnostic tool can be re-run using the new investment objective and the respective threshold for that objective.

Figure 4:
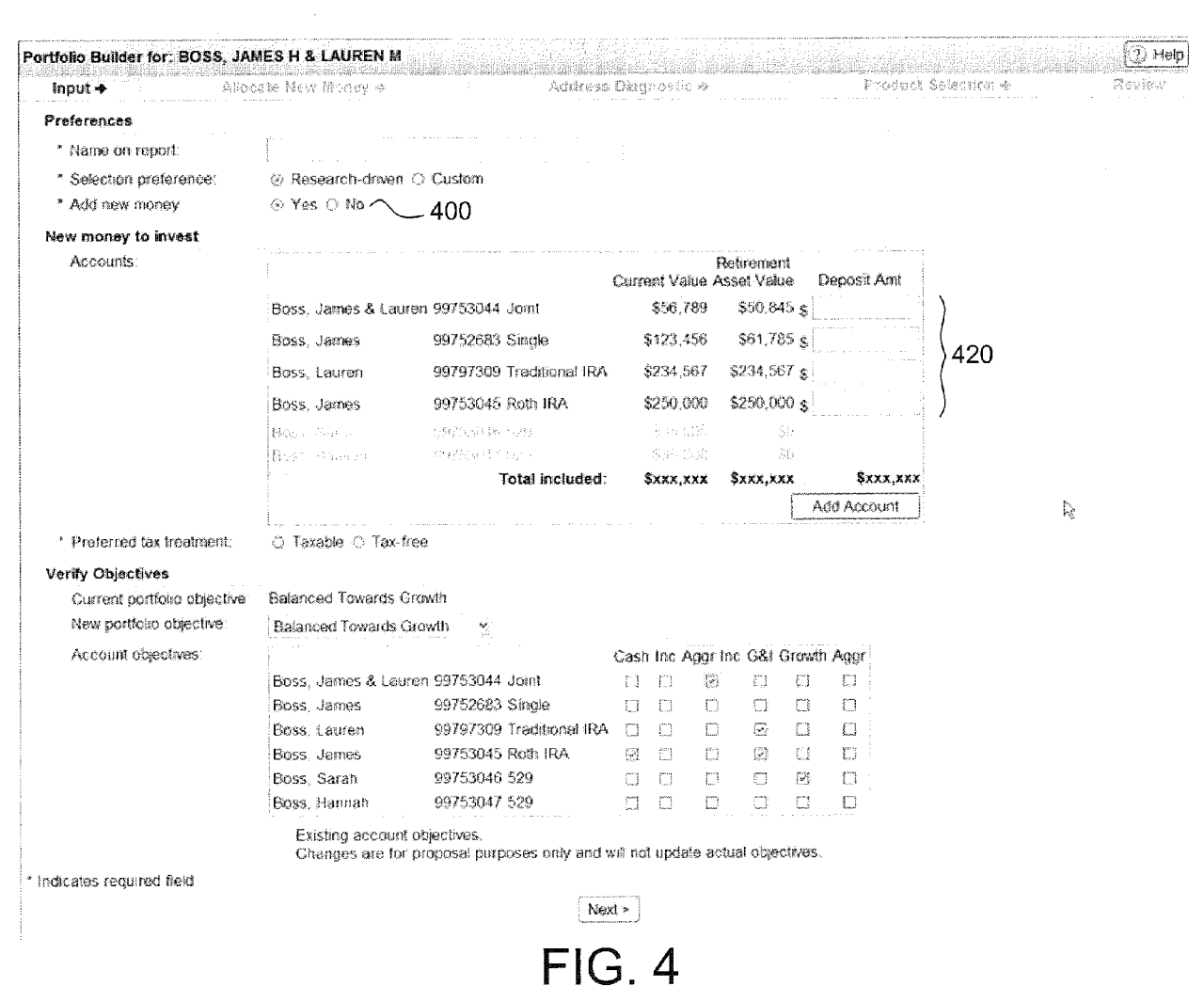

Once the evaluation is complete, the diagnostic tool can identify options to return each of the evaluation categories to the suggested guidelines. FIG. 4 illustrates one embodiment a user interface illustrating a portfolio that can be evaluated using the present disclosure. In response to the diagnostic results, a client may wish to add money to his account to address any deficiencies identified by the portfolio diagnostics. A client can indicate that it will add new money 400, and can specify which account it will be adding the new money to 420.

Figure 5:
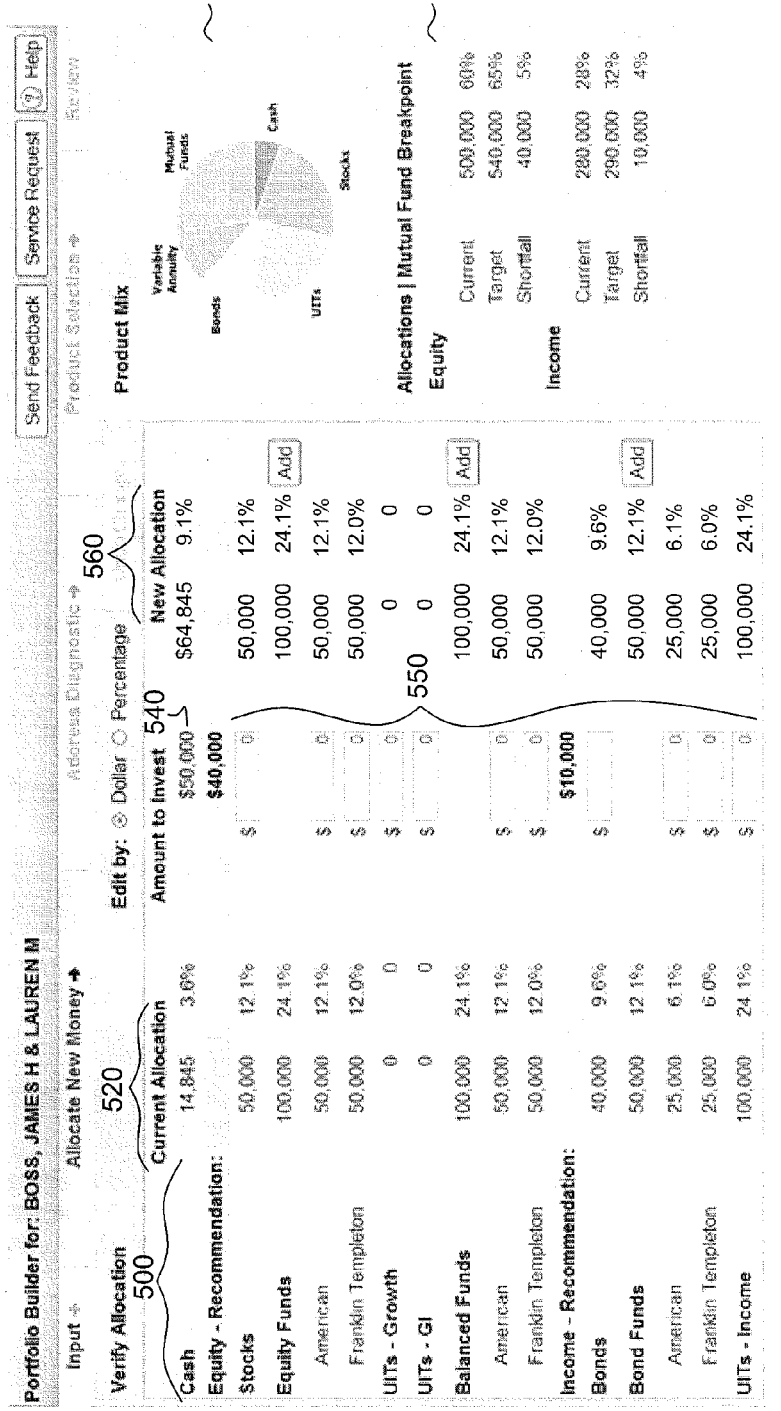
FIG. 5 illustrates one embodiment of a user interface showing the use of the present disclosure to invest additional money in the portfolio.

FIG. 5 illustrates how the new money added can be allocated to the assets in the portfolio instruments. For the selected account, the mix of assets is listed 500, and also illustrated in chart form 510. The current allocation 520 can be shown in value and allocation percentage, and illustrated in charts 510 and 530. The amount to invest is shown 540 and selectable amounts can be designated 550 for each of the types of financial instruments making up the assets of the account. As the money is allocated, the new allocation is indicated 560.

Figure 6:
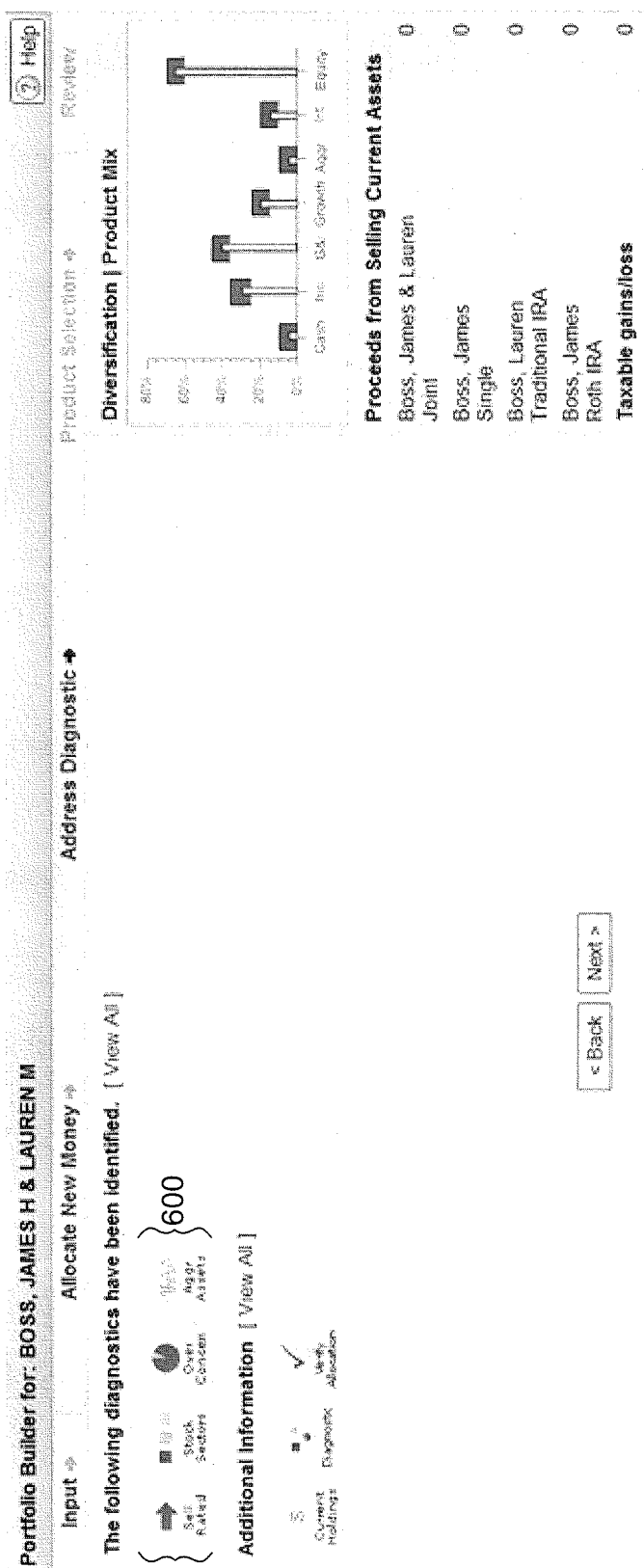
FIG. 6 illustrates one embodiment of a user interface showing the results of a diagnostic evaluation of a portfolio using the present disclosure.

FIG. 6 illustrates how the asset allocation can be adjusted in response to the results provided by the portfolio evaluation. Each evaluation category which is found to not be in compliance with the suggested guidelines can be highlighted using a selectable guideline. In this embodiment, four categories are identified, "Sell Rated", "Stock Sectors", "Over Concentration" and "Aggressive Assets" as not within suggested guidelines 600. By selecting one of the identified icons, the user interface will provide access to the options identified to bring the selected category back into compliance with the guidelines.

Figures 7A, 7B:
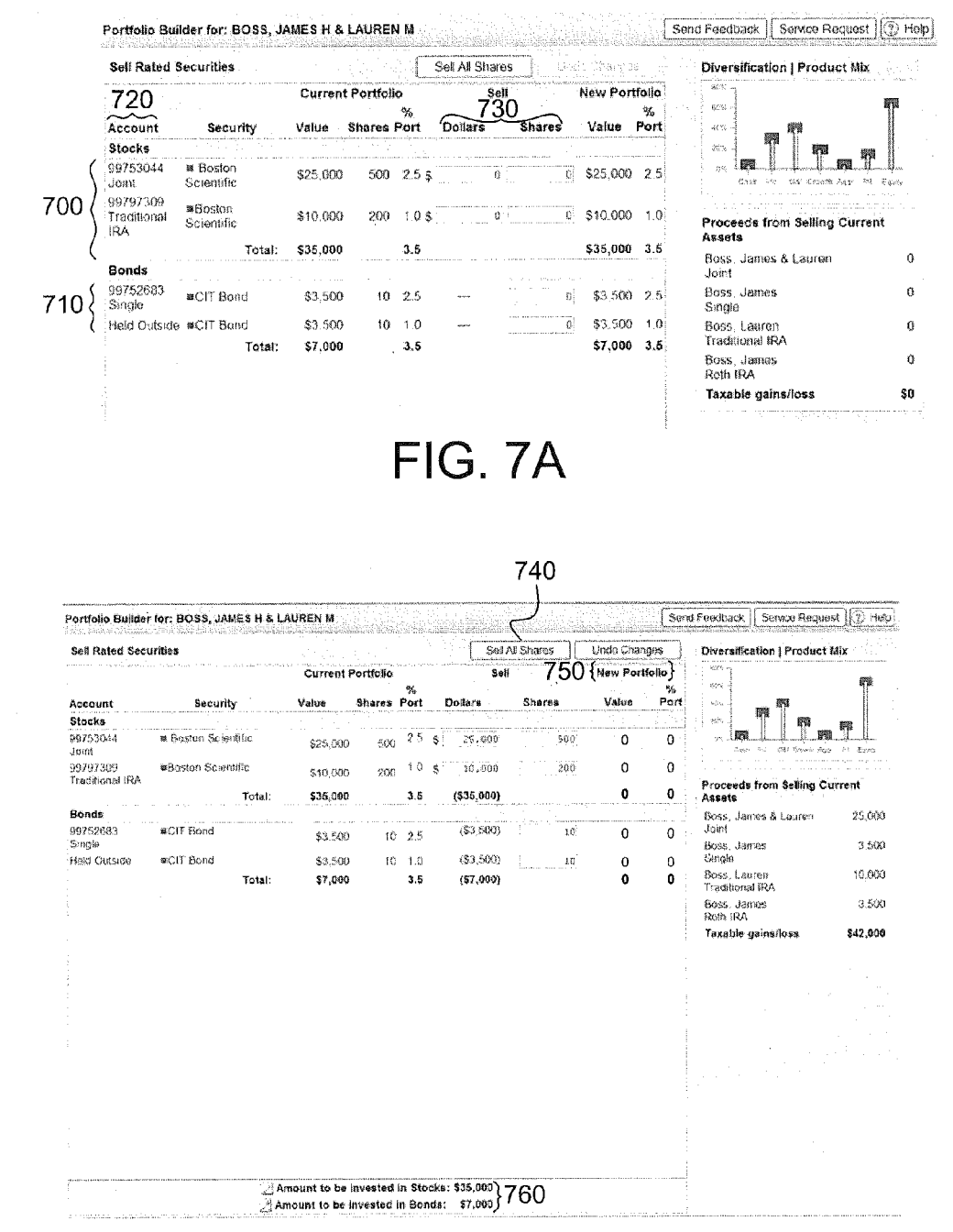

FIG. 7A illustrates the options identified for the "Sell Rated" securities category. In this embodiment, two equities 700 and two bonds 710 are identified as being held in various accounts 720 in the portfolio that according to current research are sell rated. The amount of each of the assets to be sold is selectable on an individual basis 730, or all can be selected to be sold 740.

FIG. 7B illustrates the "Sell All Shares" option 740 being chosen. The new allocation reflecting the sold shares will be updated 750, and the amount of money from the proceeds of the sale available to be invested is indicated 760, and is selectable between stocks and bonds. Once the options for "Sell Rated Securities" is chosen, the diagnostic tool can be rerun to account for the sale of the securities, which may impact the previous results presented in FIG. 6.

Figure 8:
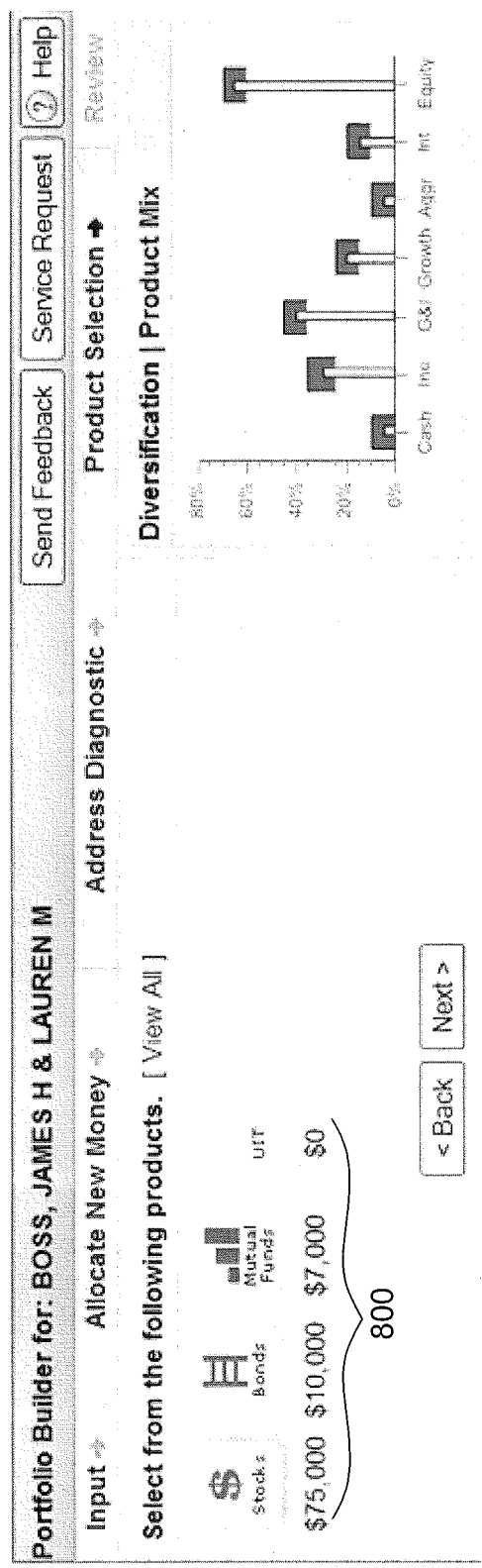
FIG. 8 illustrates one embodiment of a user interface showing the results of a diagnostic evaluation of a portfolio using the present disclosure.

FIG. 8 illustrates the results of selecting options presented by the diagnostic process which may result in additional money being available to invest in the portfolio 800. Each of the icons represents an amount of money available to invest and is selectable and adjustable between categories.

Figure 9:
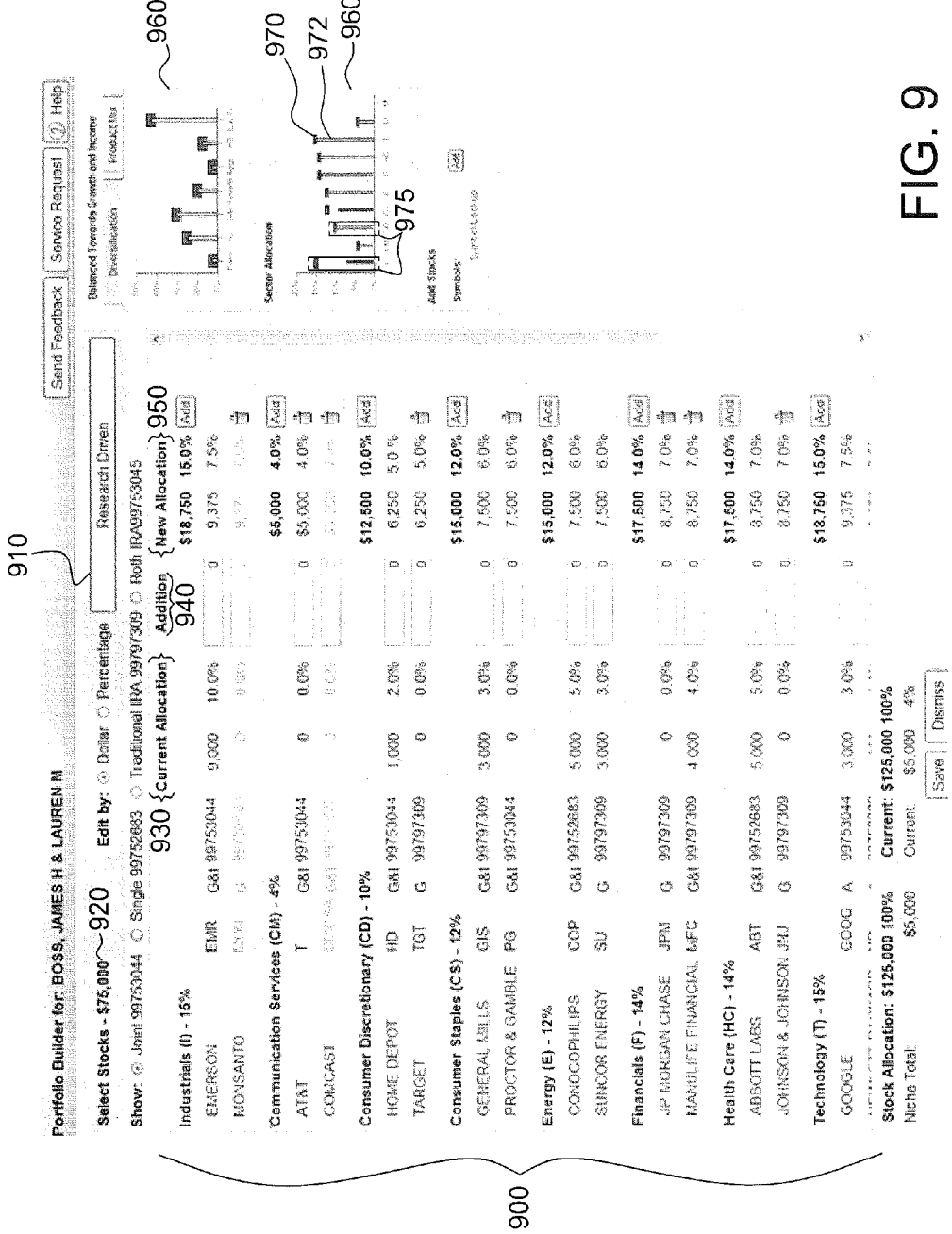
FIG. 9 illustrates one embodiment of a user interface showing the options generated as a result of a diagnostic evaluation of a portfolio using the present disclosure.

FIG. 9 illustrates options presented when the "Stocks" icon of FIG. 8 is selected. Each of the stocks identified 900 are the results of research recommendations 910 and are suitable for the portfolio in accordance with the investment objective, and the current allocation of each is shown 930. The amount of money available 920 can be allocated as desired among any of the options 940. The new allocation will be shown representing the selection 950. In order to assist the selection, charts may be provided showing the impact on allocation. A box 970 can represent the suggested guidelines, and the bar 972 can represent the current allocation. Any allocation not within the guidelines can be highlighted 975, which may assist in the selection process.

Figure 10:
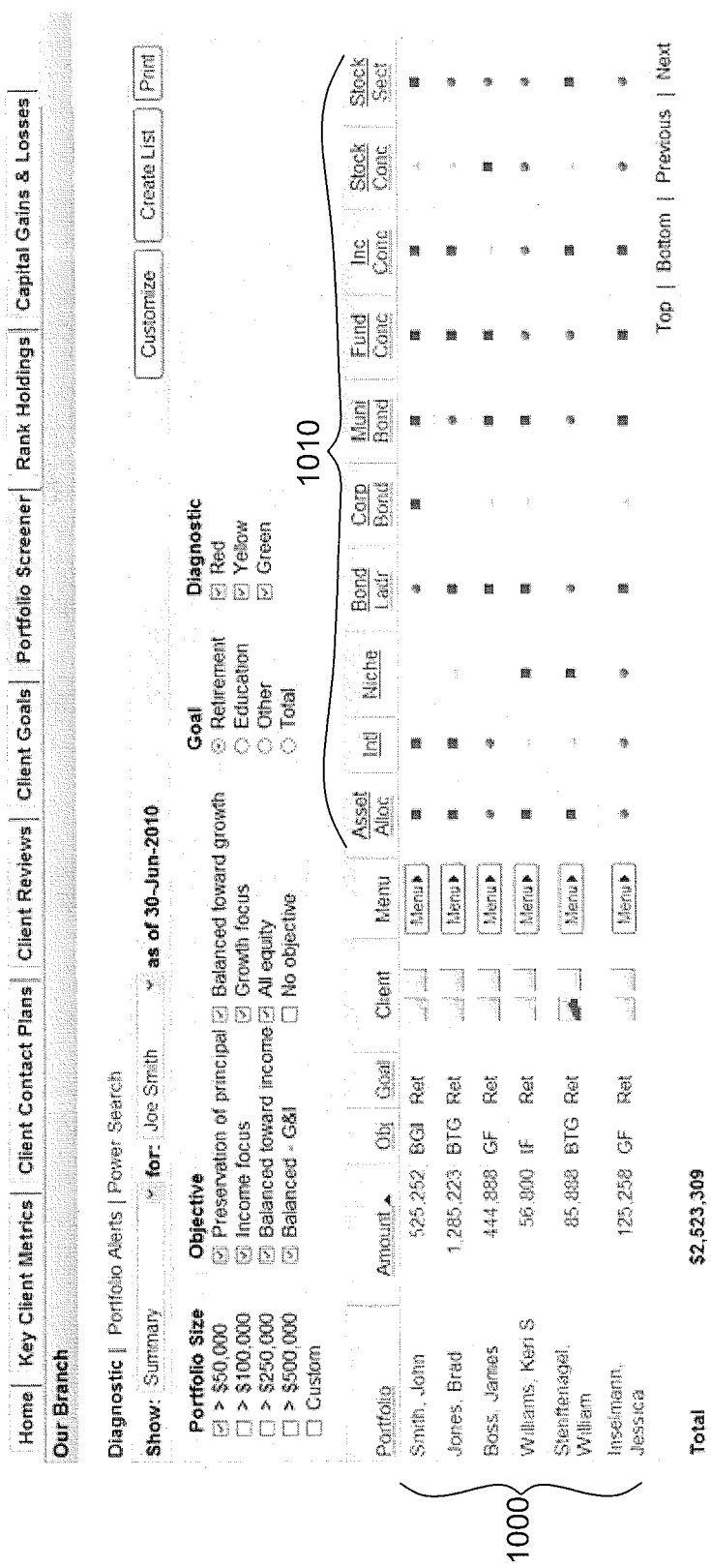
FIG. 10 illustrates one embodiment of a user interface showing portfolios ranked in priority order generated as a result of a diagnostic evaluation of a portfolio using the present disclosure.

FIGS. 2A-2D illustrate how the diagnostic model can be implemented for a single portfolio. In another embodiment, the present disclosure can be used to periodically review a plurality of portfolios. As illustrated in FIG. 10, for each portfolio 1000, the classification of the evaluation categories 1010 an be scored according to its classification, i.e., a higher score the greater the threshold is exceeded. By totaling the scores of each evaluation category, a portfolio can receive a cumulative score. Each portfolio can then be ranked by its cumulative score 1000, with the portfolios having the highest score indicating the highest deviation from their respective investment objective. In this way, the portfolios in greater need for review are highlighted for the financial advisors and resources can be directed to the portfolios in most need first.

In another embodiment, review of a single evaluation category can be carried out for many portfolios, and by using a scoring system, it can be determined which portfolios deviate the greatest from the guidelines for a specific evaluation category. With respect to FIG. 11, the diagnostic tool can score individual evaluation categories and rank the portfolios based on individual category. In this embodiment, each portfolio can have its "Asset Allocation" 1110 evaluation category scored, and the portfolios can be ranked according to score and presented showing the portfolios having the worst compliance with this category 1120.

In another embodiment, an alert can be issued based on an amount of time that a portfolio exceeds a suggested guideline. For example, a processor can store the results from the diagnostic tool in a memory means. On a subsequent evaluation of the portfolio, the memory means can provide access to the stored data to analyze trends in the data. One trend may be the amount of time that an evaluation category or an asset has exceeded a threshold.

Figure 12:
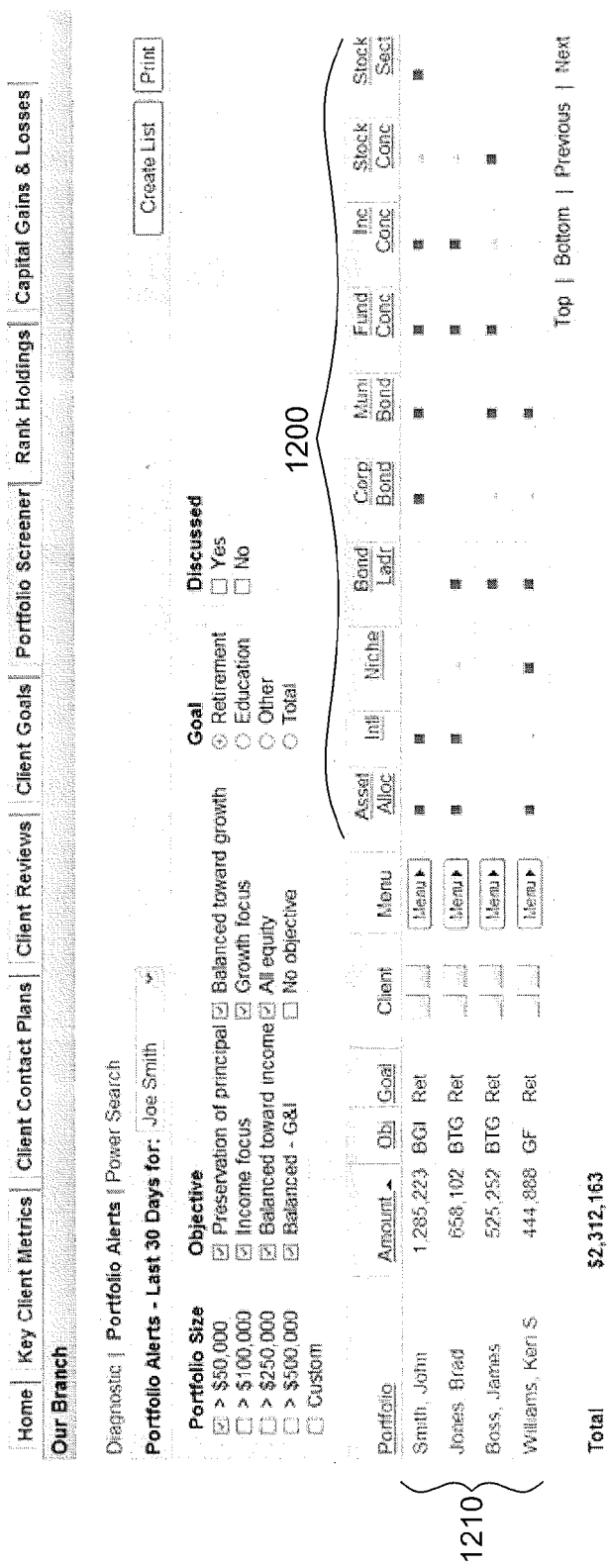
FIG. 12 illustrates one embodiment of a user interface showing portfolios that have recently been identified as not within suggested guidelines generated as a result of a diagnostic evaluation of a portfolio using the present disclosure.

In another embodiment, an alert can be generated and issued automatically to the financial advisor, his supervisor or the client upon the occurrence of an evaluation category or an asset exceeding a threshold. With respect to FIG. 12, a listing of all portfolios which were previously in compliance but now are out of compliance 1200 can be generated sorted by priority 1210.

Figure 13:
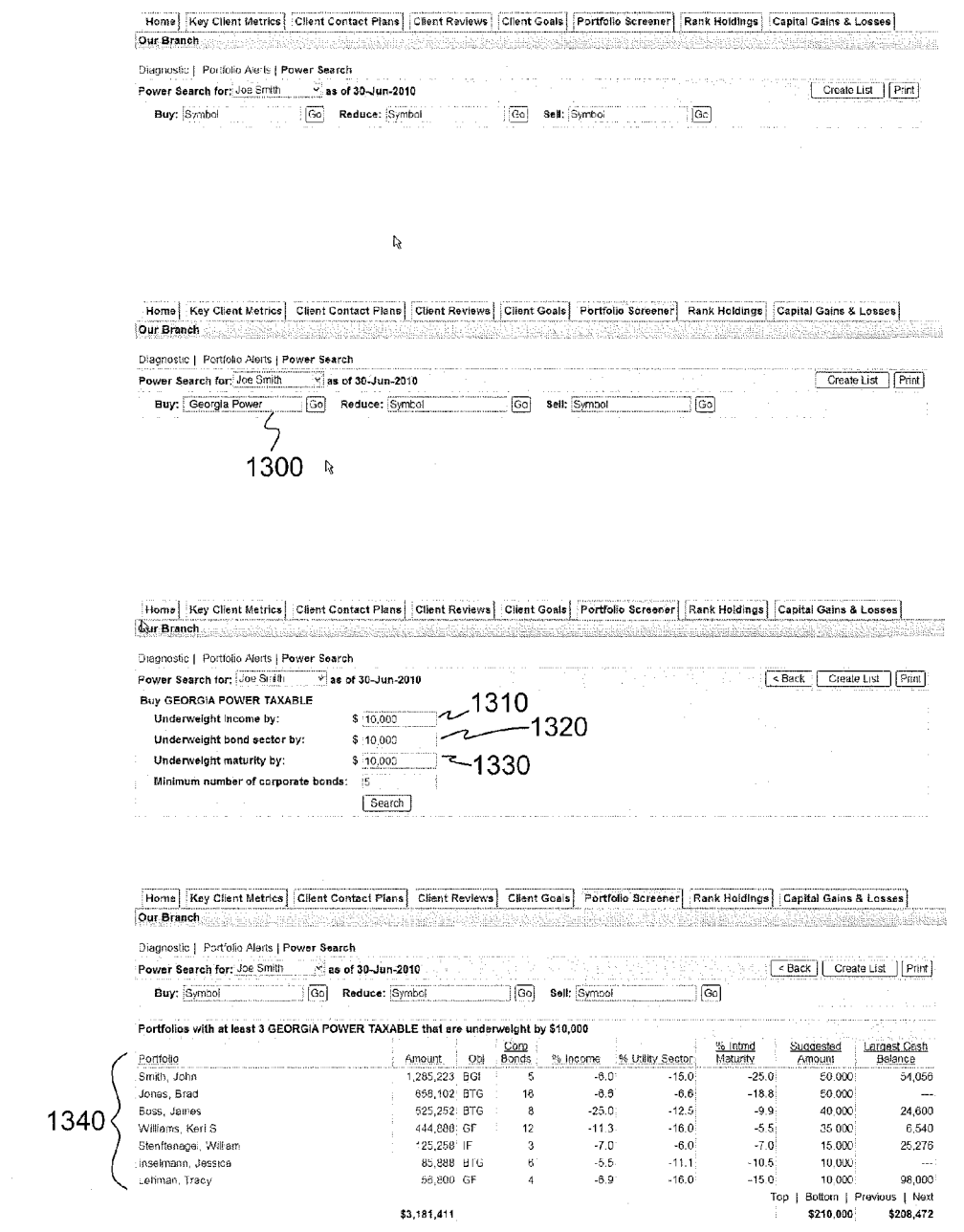

The diagnostic tool can also be used to find candidate portfolios for assets that may be available. With reference to FIG. 13, the financial advisor's firm may have bonds for Georgia Power in inventory 1300. The diagnostic tool can be used to search for portfolios which may be suitable for these assets. For example, a search can be conducted for portfolios that are underweight in the income category by a selectable amount 1310, underweight in the bond sector 1320, and underweight by maturity 1330. The diagnostic tool can search for all portfolios that meet this criteria and provide a list of candidate portfolios ranked in order of need 1340. Thus the diagnostic tool of the present disclosure can be used proactively to identify portfolios that may benefit from assets that are available to the financial advisor.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Those skilled in the art will appreciate that the present invention can be practiced by other than the described embodiments, which are presented for the purposes of illustration and not of limitation, and the present invention is limited only by the claims which follow.

What is claimed:

1. A computer implemented diagnostic method for evaluating an investment portfolio comprising:
   a. electronically receiving an investment portfolio for a client, the investment portfolio including a plurality of types of assets and at least one investment objective for the portfolio wherein the investment objective identifies the percentage of each asset type in the portfolio;
   b. selecting for each asset of the plurality of assets more than one evaluation category, wherein each evaluation category identifies criteria to be used to evaluate each asset;
   c. by a computer processor, establishing a plurality of thresholds for each evaluation category;
   d. determining the market value for each of the assets in the portfolio;
   e. by the computer processor, classifying each evaluation category as a function of an amount of deviation of the evaluation category from the established thresholds;
   f. providing a visual display of each evaluation category and identifying its classification;
   g. receiving a selection of a displayed evaluation category;
   h. by the computer processor, for the selected displayed evaluation category, identifying at least one transaction to perform that will change the classification of the selected displayed evaluation category;
   i. receiving a selected transaction from the at least one identified transaction to perform; and
   j. executing the selected transaction.

2. The method of claim 1 wherein the assets include at least one of stocks, cash, bonds, unit investment trusts (UITs), mutual funds, exchange traded funds (ETFs), and money market funds.

3. The method of claim 1 further comprising the steps of:
k. providing a user interface to display the selected transaction to a user; and
l. receiving instructions via the user interface to execute the transaction.

4. The method of claim 1 wherein the plurality of thresholds includes a concentration of an individual asset as compared to all assets held in the portfolio.

5. The method of claim 1 wherein the plurality of thresholds includes an industry sector allocation.

6. The method of claim 5 wherein the industry sectors include communications, utilities, consumer staples, energy, health care, financial services, industrials, consumer discretionary and technology.

7. The method of claim 1 wherein the step of classifying includes determining a difference between an actual concentration of an asset and a suggested guideline.

8. The method of claim 7 where the step of classifying includes comparing the determined difference with the plurality of thresholds.

9. The method of claim 1 wherein the step of selecting a displayed evaluation category includes selecting a displayed evaluation category that exceeds a threshold.

10. The method of claim 3 wherein the execution of the selected transaction includes returning an asset to satisfy a suggested guideline.

11. The method of claim 10 wherein the selected transaction is for an asset not associated with the selected displayed evaluation category.

12. A computer program for evaluating an investment portfolio, the computer program comprising:
a computer usable non-transitory medium having computer readable program code modules embodied in said medium for performing a diagnostic evaluation of an investment portfolio;
a computer readable first program code module for receiving an investment portfolio for a client, the investment portfolio including a plurality of types of assets and at least one investment objective for the portfolio wherein the investment objective identifies the percentage of each asset type in the portfolio;
a computer readable second program code module for categorizing each asset of the plurality of assets into more than one evaluation category, wherein each evaluation category identifies criteria to be used to evaluate each asset;
a computer readable third program code module for establishing a plurality of thresholds for each evaluation category;
a computer readable fourth program code module for determining a market value for each of the assets in the portfolio;
a computer readable fifth program code module for classifying each evaluation category as a function of an amount of a deviation of the evaluation category from the established thresholds;
a computer readable sixth program code module for providing a visual display of each evaluation category and identifying its classification;
a computer readable seventh program code module for receiving a selection of a displayed evaluation category;
a computer readable eighth program code module for identifying at least one transaction for the selected displayed evaluation category, to perform that will change at least one classification of the selected displayed evaluation category, and
a computer readable ninth program code module for receiving a selection of an identified transaction to perform; and
a computer readable tenth program code module for executing the selected transaction.

13. The computer program of claim 12 wherein the evaluation categories include at least two of asset allocation, international, niche, fixed-income ladder, corporate bond diversification, municipal bond diversification, stock sector diversification, security over concentration, and sell rated.

14. A system for evaluating an investment portfolio comprising:
a memory for storing computer readable code; and
a processor operatively coupled to the memory, the processor configured to:
receive an investment portfolio for a client, the investment portfolio including a plurality of assets and at least one investment objective for the portfolio, wherein the investment objective identifies the percentage of each asset type in the portfolio;
categorize each asset of the plurality of assets into more than one evaluation category, wherein each evaluation category identifies criteria to be used to evaluate each asset;
establish a plurality of thresholds for each evaluation category;
determine a market value for each of the assets in the portfolio;
classify each evaluation category as a function of an amount of a deviation of the evaluation category from the established thresholds;
provide a visual display of each evaluation category and identifying its classification;
receive a selection of a displayed evaluation category; and
identify at least one transaction to perform that will change the classification of the selected displayed evaluation category;
receive a selection from the identified transaction to perform; and
execute the identified transaction.

15. The system of claim 14 further comprising:
a user interface to display the at least one transaction to a user, and to receive instructions to execute the at least one transaction from the user.

16. The system of claim 14 wherein the plurality of thresholds includes a concentration of an individual asset as compared to all assets held in the portfolio.

* * * * *